United States Patent
Carter (10) Patent No.: US 9,311,932 B2
(45) Date of Patent: Apr. 12, 2016

(54) ADAPTIVE PAUSE DETECTION IN SPEECH RECOGNITION

(71) Applicant: International Business Machines Corporation, Armonk, NY (US)

(72) Inventor: William S. Carter, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 158 days.

(21) Appl. No.: 14/162,204

(22) Filed: Jan. 23, 2014

(65) Prior Publication Data
US 2015/0206544 A1 Jul. 23, 2015

(51) Int. Cl.
*G06F 17/27* (2006.01)
*G10L 15/26* (2006.01)
*G10L 15/00* (2013.01)
*G10L 25/78* (2013.01)
*G10L 15/04* (2013.01)
*G10L 25/87* (2013.01)
*G10L 15/22* (2006.01)

(52) U.S. Cl.
CPC .............. *G10L 25/78* (2013.01); *G10L 15/04* (2013.01); *G10L 25/87* (2013.01); *G10L 15/26* (2013.01); *G10L 2015/221* (2013.01)

(58) Field of Classification Search
None
See application file for complete search history.

(56) References Cited

U.S. PATENT DOCUMENTS

| | | | | |
|---|---|---|---|---|
| 5,848,388 A * | 12/1998 | Power | ...................... | G10L 25/87 704/239 |
| 7,366,667 B2 | 4/2008 | Dobler | | |
| 2002/0042709 A1* | 4/2002 | Klisch | ..................... | G10L 15/04 704/231 |
| 2007/0185704 A1* | 8/2007 | Yoshimura | .............. | G10L 17/26 704/10 |
| 2008/0319755 A1 | 12/2008 | Nishiiki et al. | | |

OTHER PUBLICATIONS

Baron; Prosody-Based Automatic Detection of Punctuation and Interruption Events in the ICSI Meeting Recorder Corpus, May 26, 2002.

Liu et al; Enriching speech recognition with automatic detection of sentence boundaries and disfluencies, IEEE Signal Processing Society, vol. 14 Issue:5, Sep. 2006.

* cited by examiner

*Primary Examiner* — Marcus T Riley
(74) *Attorney, Agent, or Firm* — Garg Law Firm, PLLC; Rakesh Garg; William J. Stock (57) ABSTRACT

A method, system, and computer program product for adaptive pause detection in speech recognition are provided in the illustrative embodiments. A speech stream comprising audio signal of a speech is received. A first point in the speech stream is marked with a beginning time stamp. After the first point, a pause is detected in the speech stream. The pause is of a duration at least equal to a pause duration threshold. A second point after the pause in the speech stream is marked with an ending time stamp. A portion of the speech stream between the beginning and the ending time stamps forms a first speech segment. A speech rate of the first speech segment is computed using a number of words in the first speech segment, the beginning time stamp, and the ending time stamp. The pause duration is adjusted according to the first speech segment's speech rate.

20 Claims, 6 Drawing Sheets

ADAPTIVE PAUSE DETECTION IN SPEECH RECOGNITION

TECHNICAL FIELD

The present invention relates generally to a method, system, and computer program product for speech recognition and speech to text transcription. More particularly, the present invention relates to a method, system, and computer program product for adaptive pause detection in speech recognition.

BACKGROUND

Automated speech recognition (ASR) technology provides a machine-generated transcript of speech. For example, software products are presently available to transcribe human speech to text. Typically the speech audio is input to the ASR software as a continuous stream, i.e., as the speaker continues to speak and the speaker's utterance is captured by a microphone.

Some presently available ASR implementations are designed to receive spoken phrases of a limited duration over the internet and transcribe them on demand. This mechanism is most commonly used in conjunction with cell phones for purposes such as transcription of web search terms or destination addresses for navigation or mapping.

SUMMARY

The illustrative embodiments provide a method, system, and computer program product for adaptive pause detection in speech recognition. An embodiment includes a method for adaptive pause detection in speech recognition. The embodiment receives a speech stream comprising audio signal of a speech. The embodiment marks a first point in the speech stream with a beginning time stamp. The embodiment detects, after the first point, a pause in the speech stream, wherein the pause is of a duration at least equal to a pause duration threshold. The embodiment marks a second point after the pause in the speech stream with an ending time stamp, a portion of the speech stream between the beginning and the ending time stamps forming a first speech segment. The embodiment computes a speech rate of the first speech segment using a number of words in the first speech segment, the beginning time stamp, and the ending time stamp. The embodiment adjusts, using a processor and a memory, the pause duration according to the speech rate of the first speech segment.

Another embodiment includes a computer usable program product comprising a computer usable storage device including computer usable code for adaptive pause detection in speech recognition. The embodiment further includes computer usable code for receiving a speech stream comprising audio signal of a speech. The embodiment further includes computer usable code for marking a first point in the speech stream with a beginning time stamp. The embodiment further includes computer usable code for detecting, after the first point, a pause in the speech stream, wherein the pause is of a duration at least equal to a pause duration threshold. The embodiment further includes computer usable code for marking a second point after the pause in the speech stream with an ending time stamp, a portion of the speech stream between the beginning and the ending time stamps forming a first speech segment. The embodiment further includes computer usable code for computing a speech rate of the first speech segment using a number of words in the first speech segment, the beginning time stamp, and the ending time stamp. The embodiment further includes computer usable code for adjusting, using a processor and a memory, the pause duration according to the speech rate of the first speech segment.

Another embodiment includes a data processing system for adaptive pause detection in speech recognition. The embodiment further includes a storage device including a storage medium, wherein the storage device stores computer usable program code. The embodiment further includes a processor, wherein the processor executes the computer usable program code. The embodiment further includes computer usable code for receiving a speech stream comprising audio signal of a speech. The embodiment further includes computer usable code for marking a first point in the speech stream with a beginning time stamp. The embodiment further includes computer usable code for detecting, after the first point, a pause in the speech stream, wherein the pause is of a duration at least equal to a pause duration threshold. The embodiment further includes computer usable code for marking a second point after the pause in the speech stream with an ending time stamp, a portion of the speech stream between the beginning and the ending time stamps forming a first speech segment. The embodiment further includes computer usable code for computing a speech rate of the first speech segment using a number of words in the first speech segment, the beginning time stamp, and the ending time stamp. The embodiment further includes computer usable code for adjusting, using a processor and a memory, the pause duration according to the speech rate of the first speech segment.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that the presently available ASR technology suffers from certain drawbacks. For example, the presently available ASR technology requires a limit to the length of each utterance, and transcription results are not returned until a specific utterance has been completed and processed. This manner of speech recognition and transcription can result in significant perceived performance latencies if a user transcribes a continuous stream of speech. The illustrative embodiments further recognize that such latencies are further exacerbated when using cloud-based ASR solutions. For example, the transcript of a thirty-second speech may not be received until thirty seconds after the utterance was completed and submitted from transcription.

The illustrative embodiments recognize that a continuous speech includes words spoken with pauses of different lengths depending upon the punctuation, emphasis, or style of speaking. Accordingly, the illustrative embodiments recognize a need for speech segmentation, to wit, the chopping of continuous speech signal into discrete audio segments of a desired temporal duration, phrase length, or both. This segmentation of continuous speech into appropriately sized discrete phrase or sentence fragments can trigger the automatic generation of a corresponding textual transcript in real time or near real time. The illustrative embodiments recognize that matching the structure of the textual transcript result with the phrasing cadence of the original sequence of spoken words is desirable, and that the transcript results be produced reasonably soon after the words have been spoken, e.g., within a threshold delay from the time the words have been spoken.

The illustrative embodiments used to describe the invention generally address and solve the above-described problems and other problems related to speech recognition and transcription. The illustrative embodiments provide a method, system, and computer program product for adaptive pause detection in speech recognition. An embodiment is also usable to facilitate the conditioning and preprocessing of speech audio prior to submitting it for automated speech recognition.

A pause comprises an interval of zero or below-threshold amplitude in a speech stream. For example, a pause of one hundred and fifty milliseconds in duration is common in English language speech. In some embodiments, a pause also comprises one or more specific speech patterns in the speech stream. For example, silence, expressions or sounds of hesitation in a language of the speech, phrases or sounds known to be used by a speaker to break a speech, sounds known to be used to signify the end of sentences or phrases such as clearing the throat or non-language sounds such as "ah" and "um", or a combination thereof.

The illustrative embodiments recognize that pause detection in continuous speech is a non-trivial task. For example, assume that pauses in an example speech stream comprise intervals of zero or very low amplitude. A pause duration that is longer than a particular threshold duration triggers the identification of the termination of a speech segment. A very small pause duration, e.g., twenty milliseconds, results in short speech segments, which transcribe into fragmented words or phrases in the transcripts that are hard to read. Conversely, a long pause duration, e.g., seven hundred milliseconds, results in the emission of transcripts that span multiple sentences, and which are not produced in a timely manner, e.g., within a predetermined delay of the corresponding speech segment.

Rather than utilizing a fixed time duration of detected silence, low-amplitude sound, or an audio pattern to determine the occurrence of a pause, an embodiment adjusts the time duration of such occurrences based upon how fast the speaker is talking or has recently talked. If the rate of speech is high (speaking rapidly), an embodiment correspondingly reduces the pause duration threshold. If the rate of speech is slow, the embodiment correspondingly increases the pause duration threshold.

An embodiment time-stamps the beginning and end of a speech segment recognized based on the detection of a pause of a current threshold duration value or longer. Upon transcription of the speech segment, using any available speech to text transcription application, the embodiment counts the number of words in the transcript of the speech segment.

Based on the timestamps and the number of words, the embodiment determines a rate of speech in the speech segment. For example, if the difference between the beginning and ending timestamps of a speech segment indicates that the segment is three seconds long, and the transcription shows nine words spoken in those three seconds, the rate of speech in that segment is three words per second (number of words divided by the length of the segment).

If a threshold rate of speech is set to two words per second, the rate of speech in the above example (three words per second) is fast, and the embodiment reduces the pause duration threshold. If a threshold rate of speech is set to four words per second, the rate of speech in the above example is slow, and the embodiment increases the pause duration threshold.

Furthermore, the illustrative embodiments recognize that the rate of speech may change with passage of time, speaker fatigue, density of subject matter, and many other factors. Accordingly, an embodiment monitors the changes in the rate of speech and adjusts the pause duration threshold in the manner described above.

The initial pause duration threshold can be provided to an embodiment in any manner. For example, in one embodiment, a user provides a preferred value for the initial pause duration threshold. The embodiment modifies the pause duration for a given speech from that initial pause duration threshold.

Another embodiment uses a default value for the initial pause duration threshold. For example, a set of default values for different speakers, languages, or other speech-related circumstances may be available from some source. The embodiment selects an appropriate initial pause duration threshold for a given speech stream from the set of default pause duration threshold values.

Another embodiment predicts a future appropriate pause duration threshold based on a past behavior. For example, pause duration threshold for a particular speaker can be determined and stored for future use from previous speeches by the speaker. As another example, pause duration thresholds for various languages, dialects, subject matters of speeches, speaking environments, audio equipment, and other factors can similarly be identified by previous speeches influenced by those factors, and stored for future use. An embodiment uses a stored pause duration threshold as a starting threshold for a given speech, and adjusts the pause duration threshold from that starting threshold as the speech progresses, in the manner of an embodiment described herein.

The illustrative embodiments are described with respect to certain speeches, languages, thresholds, patterns, amplitudes, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
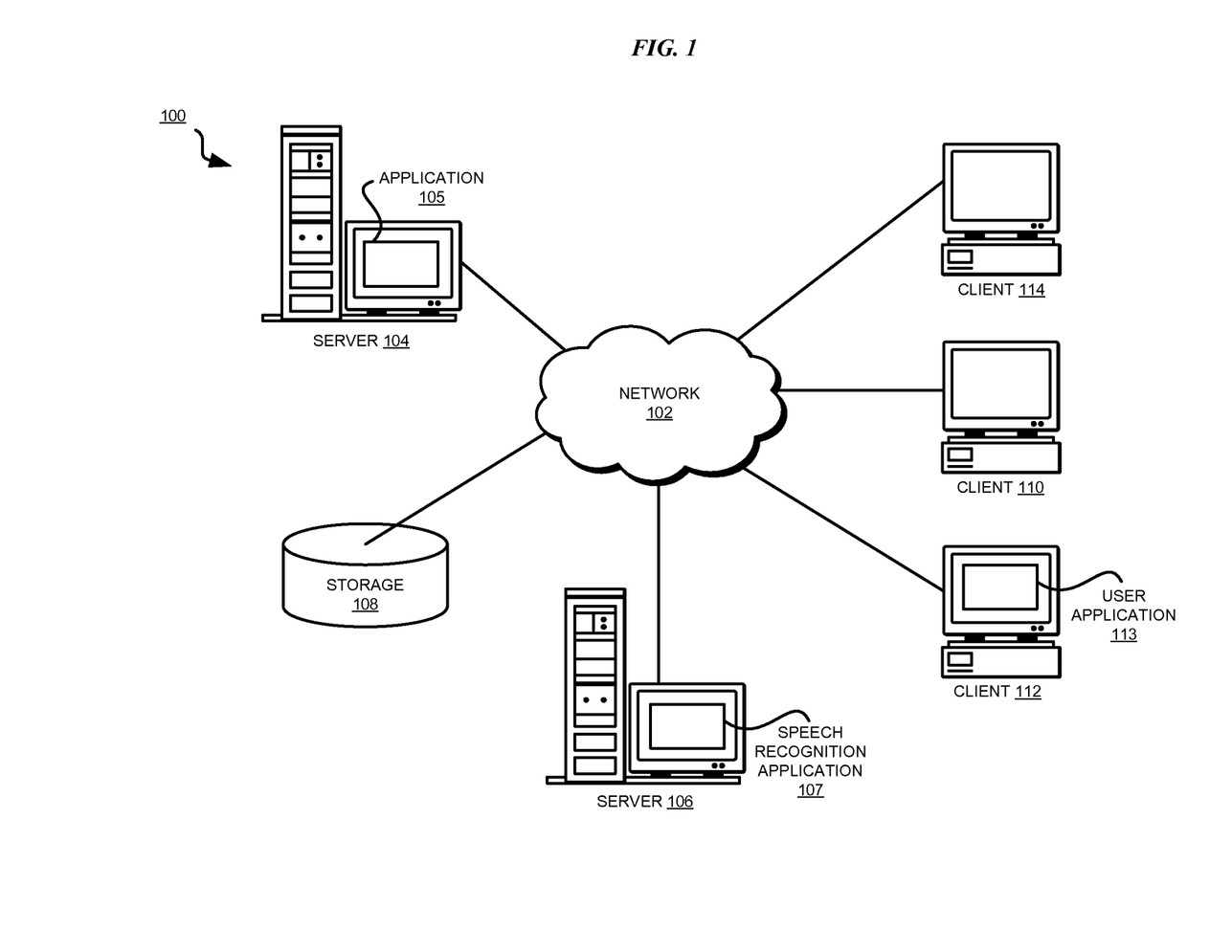
FIG. 1 depicts a block diagram of a network of data processing systems in which illustrative embodiments may be implemented.
Figure 2:
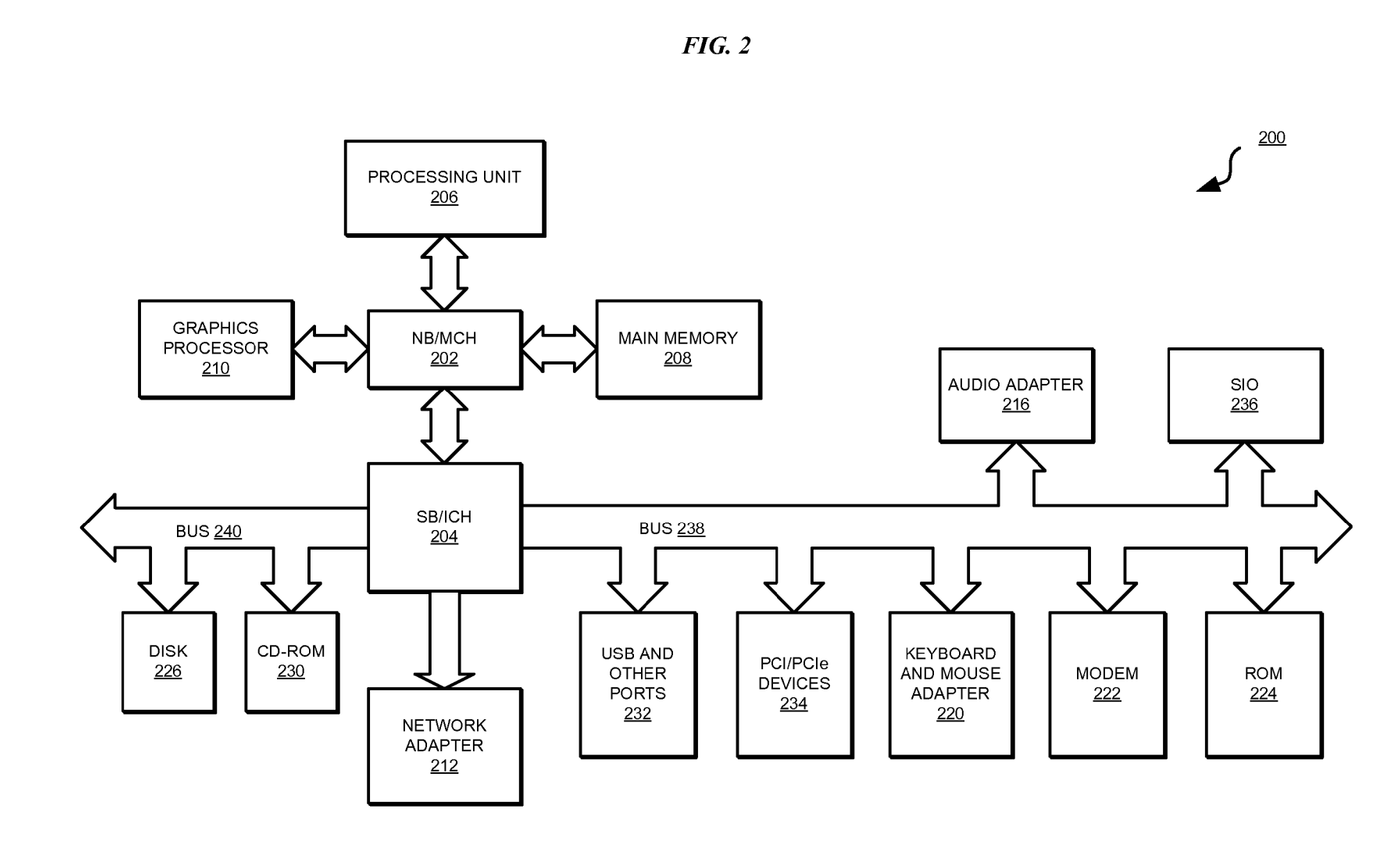
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of data processing systems in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any data processing system or device in data processing environment 100. Clients 110, 112, and 114 also couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. Servers 104 and 106, and clients 110, 112, 114, are depicted as servers and clients only as example. Data processing systems 104, 106, 110, 112, and 114 also represent example nodes in a cluster, partitions, and other configurations suitable for implementing an embodiment. Server 104 includes application 105, which includes an embodiment for adaptive pause detection in speech recognition as described herein. Application 105 uses, or otherwise operates in conjunction with, existing speech recognition application 107 to transcribe speech segments. In one implementation, server 104 comprises one or more physical or virtual data processing systems in a cloud computing environment, and application 105 is a service, accessible to user application 113 over network 102.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

Servers 104 and 106, storage unit 108, and clients 110, 112, and 114 may couple to network 102 using wired connections, wireless communication protocols, or other suitable data connectivity. For example, a cluster typically has multiple network types, such as IP networks, direct connections of machines via packets exchange implemented by storage protocols (Fibre Channel, SCSI), serial links, and message exchange via writing and reading packets to shared storage such as a hard disk drive. For performance reasons, in sending client traffic, an IP network is given precedence. Furthermore, a given network type may not connect to all nodes in a cluster. For instance, a cluster may span machines located at two geographically distant sites. For the long distance connection, Ethernet may be the preferred connection, and within a geographical location, a direct connection may be preferable. Additionally, within a geographical location, additional non-IP networks, such as Fibre channel or serial connections may be used within the scope of the illustrative embodiments.

Clients 110, 112, and 114 may be, for example, personal computers, network computers, thin clients, or industrial control systems. In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another, and encompasses components including but not limited to IP and SAN components. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), a wide area network (WAN), or mobile ad hoc network (MANET). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104, server 106, or client 112 in FIG. 1, or another type of device in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may include one or more processors and may be implemented using one or more heterogeneous processor systems. Graphics processor 210 may be coupled to NB/MCH 202 through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204 through bus 238.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Program instructions for the operating system, the object-oriented programming system, the processes of the illustrative embodiments, and applications or programs, including applications 105, 107, and 113 in FIG. 1, are each located on one or more storage devices, such as hard disk drive 226 or CD-ROM 230, and may be loaded into at least one of one or more memories, such as main memory 208, read only memory 224, or one or more peripheral devices, for execution by processing unit 206. Program instructions may also be stored permanently in non-volatile memory and either loaded from there or executed in place. For example, a program code according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

In addition, the processes of the illustrative embodiments may be applied to a multiprocessor data processing system.

In some illustrative examples, data processing system 200 may be a personal digital assistant (PDA) or another mobile computing device, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
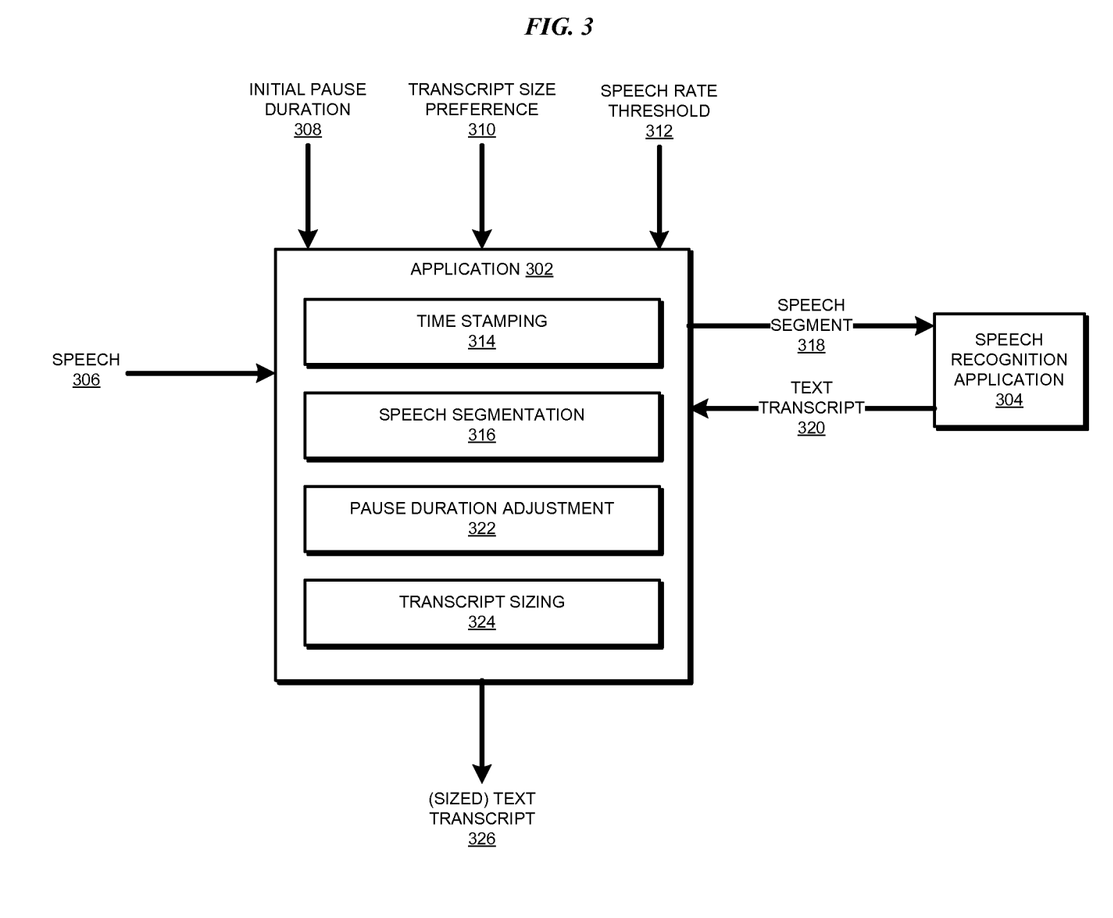
FIG. 3 depicts a block diagram of a configuration for adaptive pause detection in speech recognition in accordance with an illustrative embodiment.

With reference to FIG. 3, this figure depicts a block diagram of a configuration for adaptive pause detection in speech recognition in accordance with an illustrative embodiment. Application 302 is an example of application 15 in FIG. 1. Speech recognition application 304 is an example of speech recognition application 107 in FIG. 1.

Application 302 receives as input speech stream 306. For example, speech stream 306 is an audio stream captured by a microphone or generated by a system in the form of a continuous speech over a period.

Application 302 further receives as inputs initial pause duration threshold 308, transcript size preference 310, and speech rate threshold 312. In one embodiment, application 302 finds the values for inputs 308, 310, 312, or a combination thereof, in a configuration information accessible to application 302. The configuration information can be system generated, user provided, modified by application 302 in a previous execution, or a combination thereof. Furthermore, the configuration information may be constructed using any suitable data structure, and may be stored in any data storage device over any type of data network accessible to application 302.

In one implementation, application 302 determines or computes initial pause duration threshold 308 as described elsewhere in this disclosure. In another implementation, application 302 determines or computes speech rate threshold 312, such as based on known characteristics of speech stream 306 or a past speech, the speaker or generator of speech stream 306 or a past speech, an environment of speech stream 306 or a past speech, a subject matter of speech stream 306 or a past speech, or a combination of these and other factors.

Figure 5:
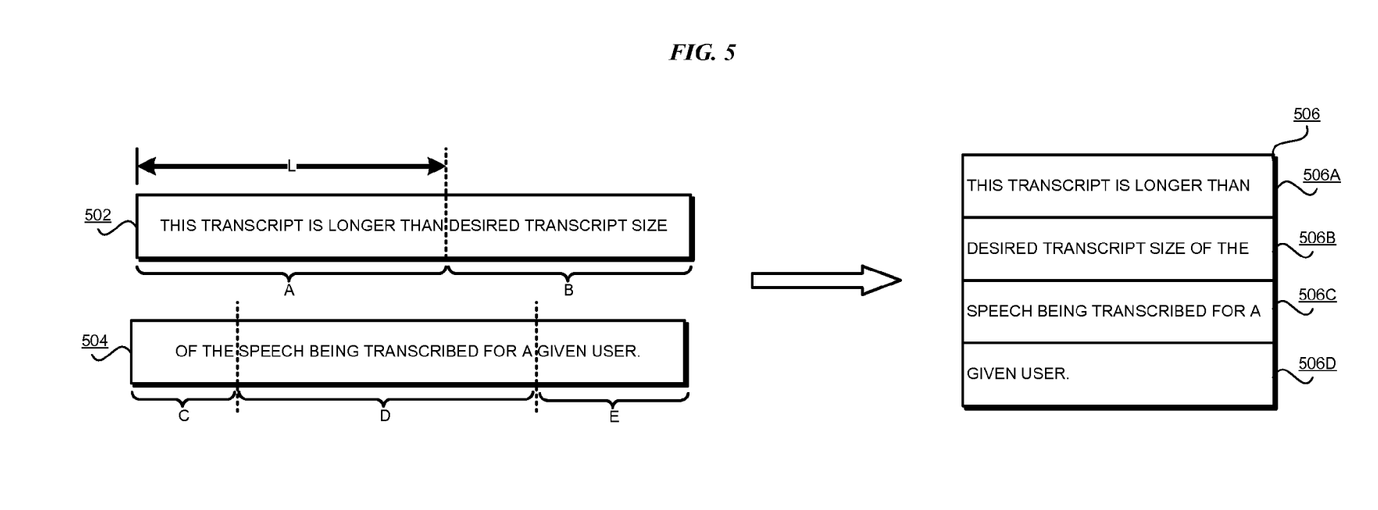
FIG. 5 depicts a block diagram of a transcript sizing operation in accordance with an illustrative embodiment.

The function of transcript size preference 310 will become clearer from the description of FIGS. 3 and 5. In one implementation, determines or computes transcript size preference 310, such as by finding the value of preference 310 in a user profile of a user who receives the transcript of speech stream 306, or by recognizing the user and thereby recalling a previously stored value of preference 310.

Time-stamping component 314 time-stamps speech stream 306. For example, component 314 time-stamps the beginning of speech stream 306 with an initial time stamp. The initial time stamp can be a clock value at the time of time-stamping, or zero or another initial value from where time counting begins.

Component 314 then time-stamps the end of a speech segment identified by component 316, and the beginning of the next speech segment in speech stream 306. Component 314 time-stamps the beginning and ends of one or more speech segments from speech streams 306 in this manner. In one embodiment, component 314 may also time-stamp intermediate portions between the beginning and the end of a speech segment.

Speech segmentation component 316 detects a pause in speech stream 306 of at least the duration of a present value of pause duration threshold. Component 316 identifies as speech segment 318 a portion of speech stream 306 from the beginning of speech stream 306 or the end of a previous speech segment and up to the detected pause. Component 314 time-stamps the speech segment as described earlier.

Application 302 sends speech segment 318 to speech recognition application 304 for transcription. Application 302 receives from speech recognition application 304 transcript 320, which corresponds to speech segment 318.

The present value of pause duration threshold is a value that is to be used at a given time for pause detection. At the beginning of speech stream 306, or at an initial stage of operation of application 302, the present value of pause duration threshold is initial pause duration threshold 308. As speech stream 306 progresses, as application 302 segments speech streams 306 and transcribes those segments, the present value of pause duration threshold is adjusted higher or lower than initial pause duration threshold 308 or a previously adjusted value of the pause duration threshold.

Component 322 performs the pause duration threshold adjustment and stores a present value of the pause duration threshold. For example, component 322 computes a speech rate using the beginning and ending time stamps of speech segment 318 and the number of words in corresponding transcript 320. Using these three values, component 322 computes a speech rate in the manner described elsewhere in this disclosure.

Component 322 compares the computed speech rate with speech rate threshold 312 to determine whether the speech rate in speech segment 318 is faster or slower than speech rate threshold 312. If the speech rate of speech segment 318 is faster than threshold 312, component 322 reduces the pause duration threshold for pause detection in a subsequent speech segment, and vice versa.

Only as an example and without implying any limitation thereto, in one embodiment, the reduction (or increase) in the pause duration threshold is proportional to the ratio by which the computed speech rate is higher (or lower) than speech rate threshold 312. For example, if the speech rate of speech segment is ten percent higher than speech rate threshold 312, component 322 reduces the pause duration threshold by ten percent, and vice versa.

Any linear proportionality between the speech rate difference and the pause duration threshold adjustment is configurable in this manner within the scope of the illustrative embodiments. Furthermore, one or more linear, non-linear, and other more complex relationships between the speech rate difference and the pause duration threshold adjustment are also configurable in this manner within the scope of the illustrative embodiments.

In one embodiment, speech rate threshold 312 is also adjustable during speech stream 306. The adjustment may be based on a user input or a computation. For example, in one embodiment, if component 322 finds that the speech rates of many speech segments are higher (or lower) than a specified value of threshold 312, component 322 may adjust the value of threshold 312 to reduce a number of segments where the speech rate differs from the value of speech rate threshold 312.

In some cases, the size of transcript 320 can be undesirable according to a user-preference. For example, a user may prefer to receive transcription in five-word long phrases and not longer. Accordingly, the user specified transcript size preference 310 to indicate a preferred length of transcribed phrases when the transcript is presented to the user.

Component 324 compares the length of transcript 320 with preference 310. If transcript 320 is longer than the preferred length according to preference 310, component 324 withholds the excess words from transcript 320, and combines (e.g., by prefixing) those excess words to the transcript of the next speech segment. Component 324 presents the remainder of transcript 320, which complies with preference 310, as sized transcript 326 to the user. Combining of excess words with a next transcript may again result in excess words, or generation of more than one sized transcripts 326.

Figure 4:
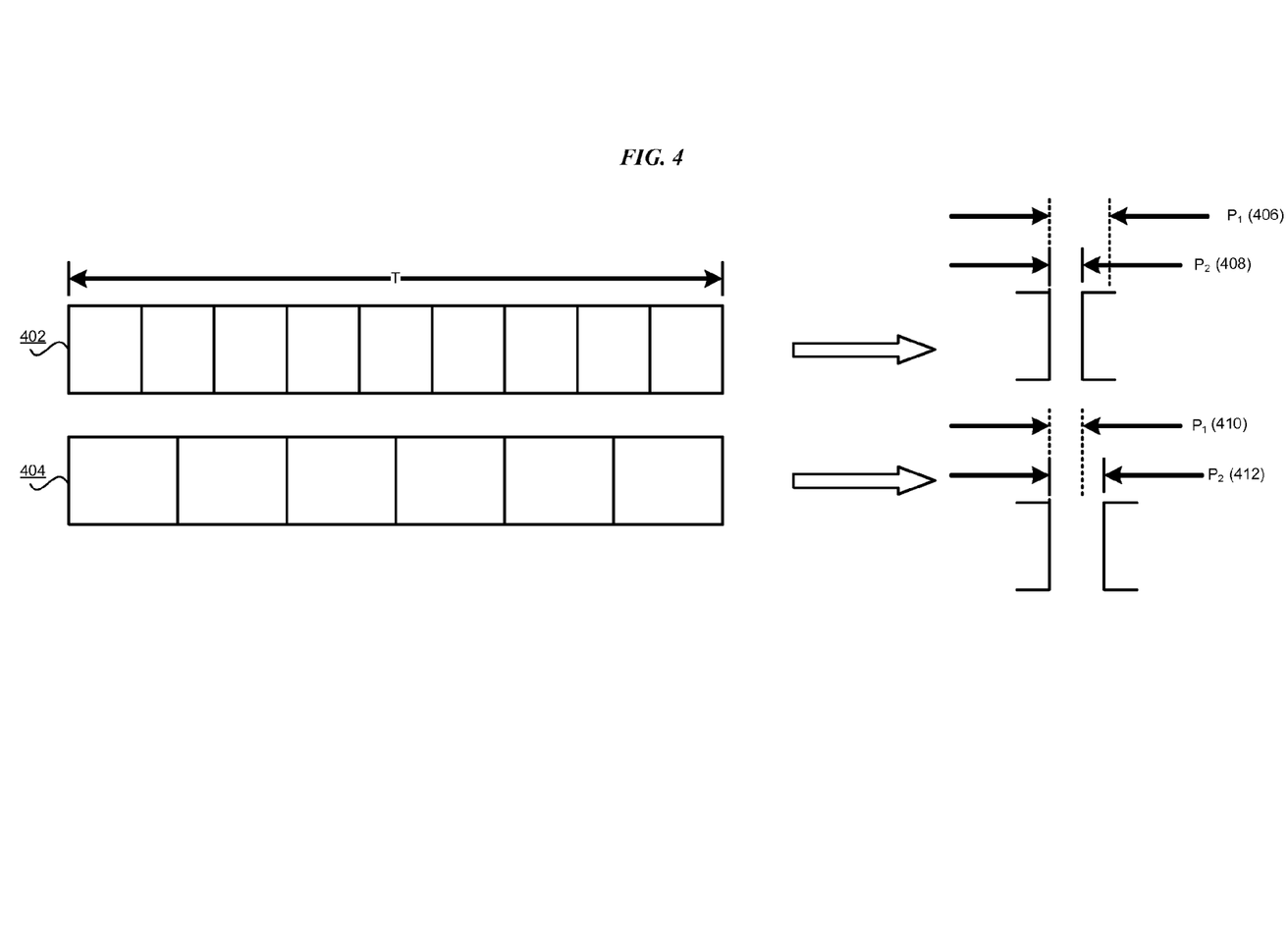
FIG. 4 depicts a block diagram of a correspondence between speech rate and a pause duration in accordance with an illustrative embodiment.

With reference to FIG. 4, this figure depicts a block diagram of a correspondence between speech rate and a pause duration in accordance with an illustrative embodiment. Transcripts 402 and 404 are different examples of transcript 320 in FIG. 3.

Assume that transcript 402 is a transcript of a speech segment spoken over a period T, where the period T is computed as a difference between a beginning and an ending time-stamp of the speech segment. Each block in transcript 402 represents a word. As shown, transcript 402 includes nine blocks representing nine words.

Duration 406 (labeled "P1") is a pause duration threshold, either set initially or adjusted according to a previous speech segment. Assume that a rate of nine words in T time exceeds a speech rate threshold. Accordingly, an embodiment reduces the pause duration to duration 408 (labeled "P2").

Similarly, as shown, transcript 404 includes six blocks representing six words over period T. Duration 410 (labeled "P1") is a pause duration threshold, either set initially or adjusted according to a previous speech segment. Assume that a rate of six words in T time is below a speech rate threshold. Accordingly, an embodiment increases the pause duration to duration 412 (labeled "P2").

Reduction of pause duration 406 to 408, allows an embodiment to shorten the speech segments during the speech segmentation process because presumably, short pauses occur more frequently in a speech than long pauses. Conversely, increasing the pause duration from duration 410 to 412 allows an embodiment to form longer speech segments during the speech segmentation process by similar reasoning.

With reference to FIG. 5, this figure depicts a block diagram of a transcript sizing operation in accordance with an illustrative embodiment. The operation to size transcripts 502 and 504 into sized transcript 506 can be implemented using component 324 in FIG. 3.

Assume that transcript 502 is a transcript of a speech segment and transcript 504 is a transcript of the next speech segment. Further assume that the user has specified a transcript size preference L, whose value is five words.

The component determines that portion A of transcript 502 is of size L, leaving excess words of portion B. The component prefixes portion B of transcript 502 to transcript 504. Portion B, thus prefixed, along with portion C of transcript 504 makes a transcript of size L. Portion D is of size L, leaving excess words of portion E in transcript 504.

Sized and combined in this manner, the component produces sized transcript 506, where each line or portion is of the desired size or less. Sized transcript 506A corresponds to portion A of transcript 502; sized transcript 506B corresponds to portion B of transcript 502 and portion C of transcript 504; and sized transcript 506C corresponds to portion D of transcript 504. Sized transcript 506D corresponds to portion E of transcript 504, if transcript 504 is the transcript of the last speech segment in a speech stream. If transcript 504 is not the transcript of the last speech segment, portion E is treated in a manner similar to portion B of transcript 502.

Figure 6:
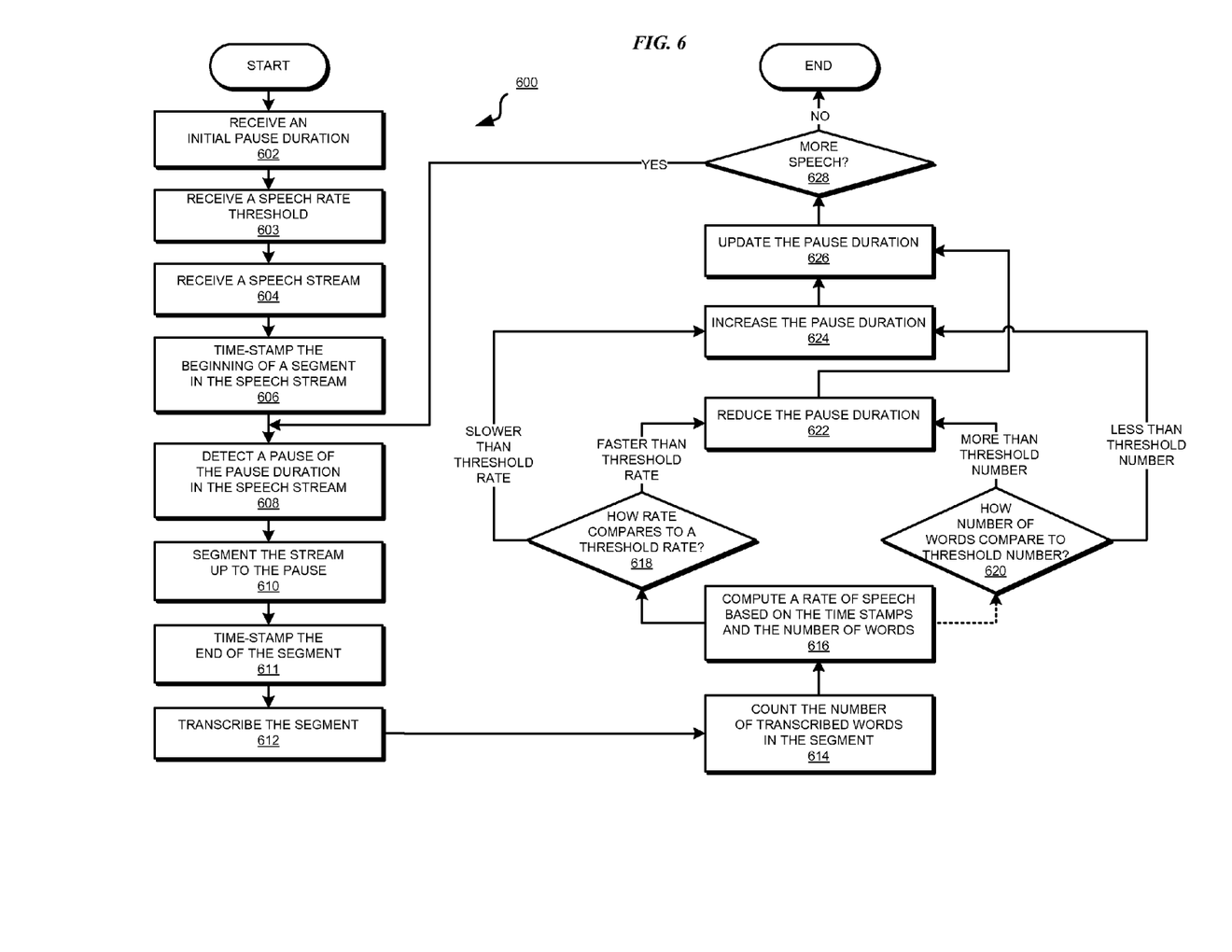
FIG. 6 depicts a flowchart of an example process of adaptive pause detection in speech recognition in accordance with an illustrative embodiment.

With reference to FIG. 6, this figure depicts a flowchart of an example process of adaptive pause detection in speech recognition in accordance with an illustrative embodiment. Process 600 can be implemented in application 302 in FIG. 3.

The application receives, determines, or computes, an initial pause duration threshold (block 602). The application also receives, determines, or computes, an speech rate threshold (block 603).

The application receives a speech stream (block 604). The application time-stamps the beginning of a segment in the speech stream (block 606). The beginning of the speech stream is also the beginning of the first speech segment, and the beginning of other speech segments follow the end of the previous speech segment.

The application detects a pause of at least a present pause duration in the speech stream (block 608). The present pause duration is the initial pause duration for the first speech segment, and adjusted thereafter as described in this disclosure.

The application segments the speech stream from the beginning time-stamp up to the detected pause as a speech segment (block 610). The application time-stamps the end of the speech segment (block 611).

The application transcribes the speech segment, or causes the speech segment to be transcribed into text (block 612). The application counts the number of words in the transcribed text of the speech segment (block 614). The application computes a rate of speech based on the beginning and ending time-stamps and the number of words in the segment (block 616).

The application determines how the computed speech rate compares to the speech rate threshold of block 603 (block 618). In an alternate embodiment, instead of receiving, determining, or computing a speech rate threshold at block 603, the application receives, determines, or computes a threshold word count in block 603. Accordingly, in such alternate embodiment, instead of the determination of block 618, the application determines how the number of words from block 614 compares to the threshold word count of block 603.

If according to the determination of block 618, the speech rate is faster that the speech rate threshold ("faster than threshold rate" path of block 618), of it according to the determination of block 620, the number of words exceeds the threshold word count ("more than threshold number" path of block 620), the application reduces the pause duration (block 622). Conversely, if according to the determination of block 618, the speech rate is slower that the speech rate threshold ("slower than threshold rate" path of block 618), of it according to the determination of block 620, the number of words is less than the threshold word count ("less than threshold number" path of block 620), the application increases the pause duration (block 624). The application can proceed to block 622 or 624, or omit steps 622 and 624, depending upon the specific implementation, when the speech rate or the word count matches the corresponding threshold.

The application updates the pause duration with the decreased pause duration of block 622 or the increased pause duration of block 624 (block 626). This updated pause duration is used for the subsequent speech segments until the pause duration is updated again during the speech stream.

Thus, the application adaptively adjusts the pause detection in a given speech during speech recognition and transcription.

The application determines whether more speech remains to be recognized and transcribed in the speech stream (block 628). If more speech remains ("Yes" path of block 628), the application returns to block 608 to detect a pause according to the updated pause duration. If no more speech remains in the speech stream ("No" path of block 628), the application ends process 600 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for adaptive pause detection in speech recognition. Certain embodiments are described with respect to the transcription of real-time or near real-time speech. From this disclosure, those of ordinary skill in the art will be able to adapt an embodiment for transcribing recorded audio of a speech, and such adaptations are contemplated within the scope of the illustrative embodiments. For example, an embodiment can be adapted to perform the transcription of recorded audio in two passes. A first pass determines an optimum or initial pause duration according to a characteristic of the recorded speech in a manner described herein. A second pass uses the pause duration determined in the first pass as an initial pause duration to transcribe the recorded speech in a manner described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for adaptive pause detection in speech recognition, the method comprising:
   receiving a speech stream comprising audio signal of a speech;
   marking a first point in the speech stream with a beginning time stamp;
   detecting, after the first point, a pause in the speech stream, wherein the pause is of a duration at least equal to a pause duration threshold;
   marking a second point after the pause in the speech stream with an ending time stamp, a portion of the speech stream between the beginning and the ending time stamps forming a first speech segment;
   computing a speech rate of the first speech segment using a number of words in the first speech segment, the beginning time stamp, and the ending time stamp; and
   adjusting, using a processor and a memory, the pause duration according to the speech rate of the first speech segment.

2. The method of claim 1, further comprising:
   determining whether the speech rate of the first speech segment exceeds a speech rate threshold; and
   reducing, responsive to the speech rate of the first speech segment exceeding the speech rate threshold, the pause duration.

3. The method of claim 2, further comprising:
   determining the speech rate threshold from a configuration information.

4. The method of claim 2, wherein an amount by which the speech rate of the first speech segment exceeds the speech rate threshold and an amount by which the pause duration is reduced have a linear proportionality relationship.

5. The method of claim 1, further comprising:
determining whether the speech rate of the first speech segment is below a speech rate threshold; and
increasing, responsive to the speech rate of the first speech segment being below the speech rate threshold, the pause duration.

6. The method of claim 1, further comprising:
determining whether the number of words in the first speech segment exceeds a word count threshold; and
reducing, responsive to number of words in the first speech segment exceeding the word count threshold, the pause duration.

7. The method of claim 1, further comprising:
determining whether the number of words in the first speech segment is less than a word count threshold; and
increasing, responsive to number of words in the first speech segment being less than the word count threshold, the pause duration.

8. The method of claim 1, further comprising:
determining whether the number of words in the first speech segment is more than a word count threshold; and
decreasing, responsive to number of words in the first speech segment being less than the word count threshold, the pause duration.

9. The method of claim 1, further comprising:
transcribing the speech segment; and
counting the number of words in a transcript of the first speech segment.

10. The method of claim 9, further comprising:
determining that the number of words in the transcript exceed a transcript size threshold;
presenting a first portion of the transcript in a presentation; and
prefixing a second portion of the transcript to a second transcript, wherein a size of the first portion does not exceed the transcript size threshold.

11. The method of claim 1, wherein the pause duration threshold is a value that is determined and stored during a speech recognition of a previous speech segment of the speech stream.

12. The method of claim 1, wherein the first point occurs at a location of an ending time stamp of a previous speech segment in the speech stream.

13. The method of claim 1, further comprising:
computing an initial pause duration threshold based on a past speech recognition of another speech stream; and
using the initial pause duration threshold as the pause duration threshold.

14. A computer usable program product comprising a computer readable storage device including computer usable code for adaptive pause detection in speech recognition, the computer usable code when executed using a processor causing a computer to carry out steps of a method comprising:
receiving a speech stream comprising audio signal of a speech; computer usable code for marking a first point in the speech stream with a beginning time stamp;
detecting, after the first point, a pause in the speech stream, wherein the pause is of a duration at least equal to a pause duration threshold;
marking a second point after the pause in the speech stream with an ending time stamp, a portion of the speech stream between the beginning and the ending time stamps forming a first speech segment;
computing a speech rate of the first speech segment using a number of words in the first speech segment, the beginning time stamp, and the ending time stamp; and
adjusting, using a processor and a memory, the pause duration according to the speech rate of the first speech segment.

15. The computer usable program product of claim 14, further comprising computer usable code which when executed using the processor causing the computer to carry out further steps of the method comprising:
determining whether the speech rate of the first speech segment exceeds a speech rate threshold; and
reducing, responsive to the speech rate of the first speech segment exceeding the speech rate threshold, the pause duration.

16. The computer usable program product of claim 15, further comprising computer usable code which when executed using the processor causing the computer to carry out further steps of the method comprising:
determining the speech rate threshold from a configuration information.

17. The computer usable program product of claim 15, wherein an amount by which the speech rate of the first speech segment exceeds the speech rate threshold and an amount by which the pause duration is reduced have a linear proportionality relationship.

18. The computer usable program product of claim 14, wherein the computer usable code is stored in a computer readable storage device in a data processing system, and wherein the computer usable code is transferred over a network from a remote data processing system.

19. The computer usable program product of claim 14, wherein the computer usable code is stored in a computer readable storage device in a server data processing system, and wherein the computer usable code is downloaded over a network to a remote data processing system for use in a computer readable storage device associated with the remote data processing system.

20. A data processing system for adaptive pause detection in speech recognition, the data processing system comprising:
a storage device, wherein the storage device stores computer usable program code; and
a processor, wherein the processor executes the computer usable program code, and wherein the computer usable program code comprises:
computer usable code for receiving a speech stream comprising audio signal of a speech; computer usable code for marking a first point in the speech stream with a beginning time stamp;
computer usable code for detecting, after the first point, a pause in the speech stream, wherein the pause is of a duration at least equal to a pause duration threshold;
computer usable code for marking a second point after the pause in the speech stream with an ending time stamp, a portion of the speech stream between the beginning and the ending time stamps forming a first speech segment;
computer usable code for computing a speech rate of the first speech segment using a number of words in the first speech segment, the beginning time stamp, and the ending time stamp; and
computer usable code for adjusting, using a processor and a memory, the pause duration according to the speech rate of the first speech segment.

* * * * *